United States Patent [19]

Fauteux

[11] 4,278,223
[45] Jul. 14, 1981

[54] SELF SUPPORTING STAND FOR HAND HELD HAIR DRIER

[76] Inventor: Denis J. Fauteux, No. 8426 Riverside Dr. E., Windsor, Ontario, Canada, N8S 1E9

[21] Appl. No.: 65,639

[22] Filed: Aug. 10, 1979

[51] Int. Cl.³ .................. A47G 29/00; A45D 20/04
[52] U.S. Cl. ................................. 248/125; 34/99; 248/121; 248/414
[58] Field of Search ............ 248/121, 122, 125, 137, 248/161, 185, 335, 337, 414; 34/96, 99, 100; 403/109, 52

[56] References Cited

U.S. PATENT DOCUMENTS

| | | | |
|---|---|---|---|
| 682,932 | 9/1901 | Eaton | 248/137 X |
| 1,380,803 | 6/1921 | Jacobs et al. | 34/96 |
| 1,744,586 | 1/1930 | Levy | 34/99 X |
| 1,796,384 | 3/1931 | McElroy | 248/161 |
| 1,852,785 | 4/1932 | Moehler | 403/109 |
| 2,013,572 | 9/1935 | McCord | 34/96 |
| 2,043,721 | 6/1936 | Warwick | 34/100 X |
| 2,727,325 | 12/1955 | Jurinic | 248/122 |
| 3,144,232 | 8/1964 | Smootz | 248/122 X |
| 3,265,346 | 8/1966 | Petrick | 248/414 |
| 3,782,002 | 1/1974 | Morane | 34/99 |

Primary Examiner—James T. McCall
Attorney, Agent, or Firm—Charles Krassov

[57] ABSTRACT

This invention consists of combining a vertical stand with a standard hand held hair drier to convert the hand drier into a self supporting one. The stand is made into telescopic components for height adjustment; and the drier is attached to the stand, at its top, swivably, so that it can be adjusted to any required angle. The drier to stand attachment consists of a bow-shaped yoke with a bolt in each of its upright arms. The bolts are aligned to meet in the center of the yoke, and the end of each bolt is equipped with a curved plate which is free to rotate. The hand drier is clamped between the said curved plates at any required angle. The required friction between the telescopic components of the stand is provided by springs in compression contained in the inner component, pressing against the inner wall of the outer component.

1 Claim, 4 Drawing Figures

SELF SUPPORTING STAND FOR HAND HELD HAIR DRIER

This invention consists of a device for converting a hand held drier into a self supporting hair drier.

The primary object of the invention being to free a person's hands so that he or she can perform such functions as shaving or applying make up, etc., while the hair is being dried.

Another object of the invention is to free the hands from holding the drier while certain operations have to be performed which are carried out simultaneously with the drying of the hair, such as combining, dyeing, or styling of the hair.

In addition, this invention has many other valuable features which can be listed as follows, (a) It eliminates fatigue for people who are unable to hold the usually heavy drier for any length of time.

(b) It provides a safety factor guarding against electric shock when the drier is used in water available areas such as bathrooms or shower rooms.

(c) It also allows the drier to be used on other parts of the body which are not accessible by the use of the hand drier.

The above objectives are accomplished by the invention by providing a stand to which the hand held drier can be attached, adjusted to various heights, and at various angles.

In describing the invention reference will be made to the attached drawings in which.

Figure 3:
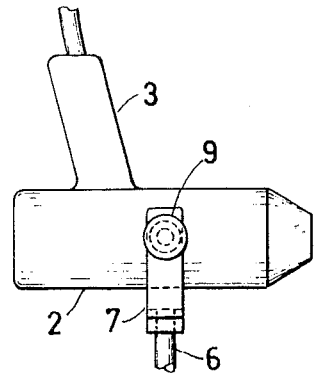
FIG. 3 shows one detail of the invention.

The invention is shown consisting of a telescopic stand 1 having a comparatively wide, somewhat heavy base 4, from the center of which extends upwardly a long tube 5. Sliding within the tube 5 is a tube or rod 6, to the upper end of which is centrally attached a bow shaped yoke 7 for holding therein a standard hand held hair drier 2, which is usually provided with a handle 3.

Each of the upright sides of the yoke 7 is provided with a threaded bolt 8. These bolts are in line with each other, and whose ends point towards the center of the yoke. The bolts 8,8, are screwed within tapped holes in the arms of the said yoke, and are manually screwed into or out of the yoke 7, by knurled knobs 9,9, which serve as the heads of the said bolts. Attached to the end of each bolt 8 is a short, slightly curved plate 10. These plates 10,10, serve the purpose of holding enclosed between them the drier 2; consequently, the curvature of these plates has to conform generally with the outer contour of the drier.

The height of the drier is adjusted to the required height by pulling out or pushing in the rod 6 out of or into the tube 5; and in order to maintain this height, the rod 6 is provided with means to prevent it from sliding further into the outer tube 5, by the weight of the drier. To provide sufficient resistance between the outer tube 5 and the inner rod 6, so that external pressure is required to push the rod 6 into the tube 5, to reduce the height, and external pull is required to pull said rod out of the tube, a plurality of transverse, spaced holes are provided in the said rod, near its bottom, which contain springs 11 in compression, whose ends press against the inner wall of the tube 5.

The angle of the blower is adjusted by rotating the blower 2 within the yoke 7. This is accomplished by having the plates 10,10, rotatably attached to the ends of the bolts 8. The adjusted angle can be maintained by tightening the bolts 8 against the body of the blower.

Figure 2:
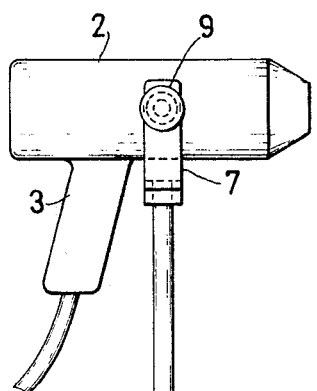
FIG. 2 shows a side view of the invention.
Figure 1:
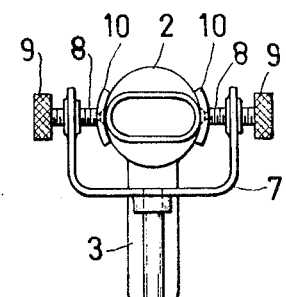
FIG. 1 shows a front view of the invention.
Figure 4:
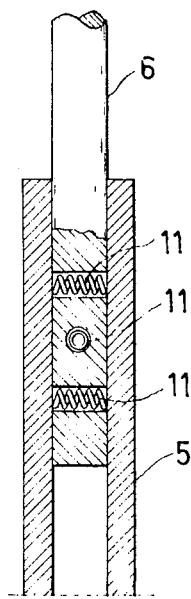
FIG. 4 shows another detail of the invention.

In FIG. 2, the blower is shown being held in a normal position at right angles, or at a small angle, to the vertical stand. To support the drier approximately at its middle and at the same time provide a large angle with the stand, it may be necessary to rotate the drier into the position shown in FIG. 3, so that the handle 3 of the drier will not become an obstacle to the rotation.

For safety purposes, the base 4 is preferably made circular in shape and of a comparatively large diameter. It can also be made of a heavier metal to provide a greater stability.

I claim:

1. An upright stand for removably attaching a normally hand-held hair drier to the top thereof, for the purpose of freeing a person's hands for various other cosmetic purposes, while drying the hair, comprising in combination, a somewhat heavy circular base, from the center of which extends upwardly a long tube containing therein a smooth sliding round rod, for the purpose of extending or reducing the height of said stand; means for holding said stand to a required height, comprising several springs located within, and near the bottom of said rod, said springs being in compression, and the ends of which press against the interior of said tube; and means for attaching the said hand-held hair drier to the top of said round rod, comprising a bow-shaped yoke the base of which is centrally and permanently attached to the top of said rod; each of the two vertical arms of the yoke having a threaded bolt passing therethrough, said bolts being on the same centerline; a knurled knob attached to the outer end of each of said bolts, for manually rotating them; and a concave plate attached to the inner end of each of said bolts for partly enclosing the body of the hand-held hair drier firmly between them, said concave plates being free to rotate upon the ends of said bolts.

* * * * *